United States Patent [19]
Bentley et al.

[11] Patent Number: 4,513,976
[45] Date of Patent: Apr. 30, 1985

[54] ROTATING-LIP GREASE SEAL

[75] Inventors: Gustavus A. Bentley, Ann Arbor; Stephen E. Nash, Farmington Hills; Gerald P. Pichler, Dearborn, all of Mich.

[73] Assignee: Federal-Mogul Corporation, Southfield, Mich.

[21] Appl. No.: 617,699

[22] Filed: Jun. 6, 1984

[51] Int. Cl.³ .................... F16J 15/32; F16J 15/34
[52] U.S. Cl. ................................ 277/25; 277/82; 277/84; 277/152
[58] Field of Search ............... 277/25, 82, 84, 152, 277/153, 173, 174, 177

[56] References Cited

U.S. PATENT DOCUMENTS

| | | | |
|---|---|---|---|
| 2,509,461 | 5/1950 | Ulseth | 288/3 |
| 2,665,929 | 1/1954 | Sawyer | 277/25 X |
| 2,856,208 | 10/1958 | Cobb. | |
| 2,990,201 | 6/1961 | Stephens | 277/82 |
| 3,016,251 | 1/1962 | Gilbert. | |
| 3,064,982 | 11/1962 | Stephens | 277/95 |
| 3,144,280 | 8/1964 | Sorenson | 308/36.1 |
| 3,578,361 | 5/1971 | Corrigan | 285/98 |
| 3,606,351 | 9/1971 | Hallerback | 277/25 |
| 3,685,838 | 8/1972 | Malmstrom | 277/25 |
| 3,703,296 | 11/1972 | Malmstrom | 277/25 |
| 3,963,248 | 6/1976 | Bainard | 277/82 X |
| 4,049,281 | 9/1977 | Bainard | 277/1 |
| 4,106,781 | 8/1978 | Benjamin et al. | 277/82 |
| 4,402,558 | 9/1983 | Olschewski | 308/187 |

FOREIGN PATENT DOCUMENTS 3,031,870  3/1982  Fed. Rep. of Germany.

Primary Examiner—Robert S. Ward
Attorney, Agent, or Firm—Robert F. Hess

[57] ABSTRACT

A fluid seal for use between a stationary member and a rotating member. A rigid member mounted on the stationary member has a peripheral cylindrical portion joined to a peripheral frustoconical portion. A sealing assembly mounted on the rotating member has a supporting case and a radial flange. An elastomeric body is bonded to the flange and has, to one side of the flange, a radially outwardly projecting frustoconical auxiliary lip engaging the peripheral cylindrical portion. A main sealing lip, comprising an annular, flexible, polytetrafluoroethylene planar wafer, is bonded to the body on the other side of the flange from the auxiliary lip. This main lip extends radially outwardly, the wafer normally tending to assume a substantially radial position. One face of the wafer engages and is flexed by the frustoconical portion. The centrifugal force of the rotating member in either direction tends to urge the lips more snugly against the rigid member.

6 Claims, 3 Drawing Figures

ROTATING-LIP GREASE SEAL

This invention relates to an improved rotating-lip grease seal.

BACKGROUND OF THE INVENTION

Grease seals have been in use for many years to prevent loss of grease from and entry of dirt and liquid into bearings, including ball bearings.

Ordinary elastomers have been used for excluding grit and water, but they have tended to wear out quickly and also to exert excessive friction against their mating member, unless the risk is taken of not providing sufficient interference.

Polytetrafluoroethylene can give longer life and also reduce friction for a given interference but polytetrafluoroethylene is not easy to mold and in the past has been costly. Hence, the normal polytetrafluoroethylene lip is a simple flat wafer type of washer or annulus, and such a lip has been clamped into place.

Even with polytetrafluoroethylene, it is desirable to assure that the more rapid the rotation the better the seal between the lip and the member it engages.

SOME PRIOR-ART STRUCTURES

German patent DE No. 3 031 870 is a grease seal of a type called in that patent a "cassette seal". Although it bears some superficial resemblance to the seal of the present invention, it does not employ a wafer of polytetrafluoroethylene. Also, its action is quite different because its elastomeric lip is mounted on a stationary shaft, and is wiped by a rotating bore wall. The seal lip is not rotated and does not generate the centrifugal force, while the present invention uses centrifugal force as an important element.

Another grease-purgeable seal is shown in U.S. Pat. No. 4,106,781. There again, the seal does not employ polytetrafluoroethylene.

SUMMARY OF THE INVENTION

This invention comprises a rotating-lip grease seal for use between a stationary machine member and a rotating machine member. The seal is provided with two lips, one of them a polytetrafluoroethylene lip bonded to an elastomeric body and so placed as to employ centrifugal force to increase the sealing action as the rotational velocity increases.

One component of the seal is a rigid member mounted on the stationary member of the machine. This rigid member has a peripheral cylindrical portion joined to a peripheral frustoconical portion extending toward the rotating member. This frustoconical portion has a lip-engaging surface on the side facing the rotating member. The other component of the seal is a sealing assembly having a supporting case for mounting with a leak-tight fit on the rotating machine member. This case is provided with a radial flange, and an elastomeric body is bonded to the flange. To one side of the flange the body has a radially outwardly and axially outwardly projecting auxiliary lip engaging the peripheral cylindrical portion of the rigid member. On the other side of the flange is the main lip,—an annular, flexible, polytetrafluoroethylene planar wafer. This wafer is bonded to the body and extends radially outwardly. Normally, the wafer tends to assume a substantial radial position, but is flexed by the frustoconical portion of the rigid member. The wafer has an outer edge and first and second opposite faces. The first face engages the lip-engaging surface of the frusto-conical portion.

In operation, the centrifugal force of rotation of the rotating member in either direction tends to urge the first face more snugly against the lip-engaging portion of the frustoconical portion of the rigid member.

More specifically, the sealing assembly preferably comprises a metal case with an inner cylindrical portion comprising the portion engaging the rotatable member. This case has the radially outwardly extending flange to which the elastomeric body is bonded. The auxiliary lip extends axially in the opposite direction from that in which the main sealing lip is flexed.

DESCRIPTION OF A PREFERRED EMBODIMENT

A seal for a front-wheel-drive front spindle

Figure 1:
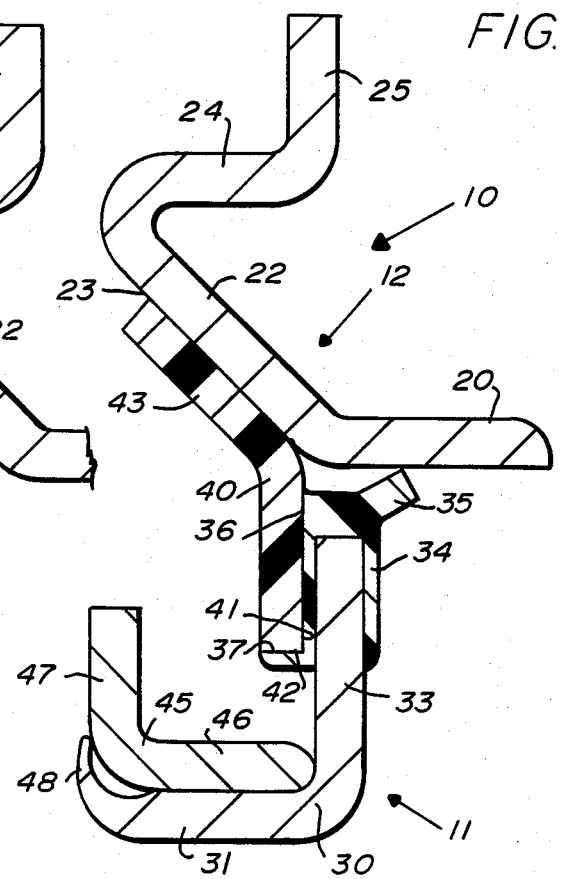
FIG. 1 is a view in cross section of about half of an annular shaft seal embodying the principles of the invention. The view includes an optional inner case.
Figure 2:
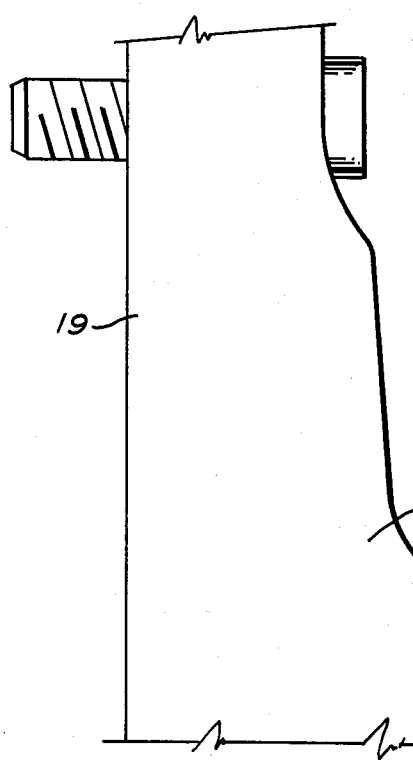
FIG. 2 is a fragmentary view in section showing an installation of a seal like that of FIG. 1 (except for omission of the optional inner case) in a front-wheel-drive front spindle of a motor vehicle.

FIGS. 1 show an assembled shaft seal 10 embodying the principles of this invention, and FIG. 2 shows its installation in a front-wheel-drive front spindle of an automobile or truck.

The shaft seal 10 has a rotor 11 and a stator 12. The rotor 11 is an annular assembly fitting around a rotating member 13 (see FIG. 2) which, among other things, includes at one end an inner race 14 for a ball bearing 15 provided with a cage 16. At its other end rotating member 13 includes a radially extending annular wheel flange 19. The stator 12 is a one-piece annular member secured to a stationary member 17 providing an outer race 18 for the ball bearing 15.

The stator 12 includes an inner cylindrical portion 20 engaging an inner cylindrical periphery 21 of the stationary member 17 in a leak-tight fit. An angularly extending portion 22 provides a frustoconical sealing surface 23 on its radially inner side. A reversing outer cylindrical portion 24 leads back to a finial radial portion 25 which engages a radial end wall 26 of the stationary member 17 (FIG. 2).

The rotor 11 has a case member 30 with a cylindrical flange 31 that engages the outer periphery of a cylindrical portion 32 of the rotating member 13. The case member 30 also has a radially outwardly-extending radial flange 33, to the outer portion of which is bonded an elastomeric body 34. The body 34 preferably provides an integral auxiliary lip 35. On the other side of the radial flange 33 from the auxiliary lip 35, the body 34 provides a radial surface 36 and a short axially extending surface 37 to which a wafer 40, preferably of polytetrafluoroethylene, is bonded along its radial surface 41 and axially extending surface 42. This wafer 40 is the main lip of the seal, and it has a free lip portion 43, which normally extends radially and is radial before assembly of the rotor 11 and stator 12 (see FIG. 3). This free lip portion 43 is flexed by the angular or frustoconical stator portion 22 and engaged by it in a rotary leak-tight fit, to exclude the passage of material from the air outside.

An inner case 45 is optional. If used, it has a cylindrical portion 46 nested against the cylindrical portion 31 and a radially extending portion 47 which is engaged by a curled over end portion 48 of the case 30.

Figure 3:
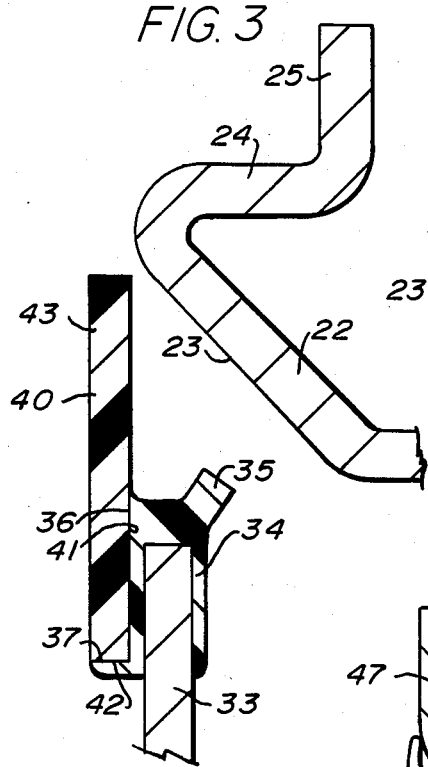
FIG. 3 is a fragmentary view of portions of FIG. 1 prior to assembly, with the lips still unflexed.

As shown in FIG. 3, the lip 40 is completely radial before assembly of the seal, which may be done upon installation as in FIG. 2. The lip 35 is also more nearly radial before assembly. Upon assembly, the rotor 11 and stator 12 are moved axially toward each other to the position shown in FIGS. 1 and 2, where the main lip 40 is flexed to the left as shown in the drawings, and the auxiliary lip 35 is flexed to the right.

In operation, the machine member 13 rotates. No matter which is the direction of rotation, the centrifugal force tends to cause both lips 35 and 40 to engage their respective sealing surfaces 20 and 23 more firmly, acting against the direction of flexing, so that the lip 40 is caused to increase its resistance to the inward passage of fluids and gritty dirt particles from the outside, while the lip 35 increases its function of holding in the grease.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A fluid seal, including in combination:
   a stationary rigid member having a radially inner peripheral cylindrical portion joined to a peripheral frustoconical portion having a lip-engaging radial inner surface,
   a sealing assembly having a supporting case provided with a radially outwardly extending flange lying radially within said rigid member,
   an elastomeric body bonded to said flange and having, to one side of said flange, a radially outwardly projecting frustoconical auxiliary lip engaging said peripheral cylindrical portion, and
   a main sealing lip comprising an annular, flexible, polytetrafluoroethylene planar wafer bonded to said body on the other side of said flange from said auxiliary lip and extending radially outwardly, said wafer normally tending to lie in a substantially radial plane, said wafer having an outer edge and first and second opposite faces, one said face engaging and being flexed away from said auxiliary lip by said lip-engaging surface of said frustoconical portion,
   the centrifugal force of rotation of said rotating member in either direction tending to urge both lips more snugly against said rigid member lip-engaging radial inner surface.

2. The seal of claim 1 wherein said sealing assembly comprises
   a metal case with an inner cylindrical portion said flange being radial,
   said elastomeric body having said auxiliary lip extending axially away from said flange in the opposite axial direction from that in which said main sealing lip is flexed.

3. A fluid seal for use between a stationary member and a rotating member, including in combination:
   a rigid member for mounting on said stationary member and having a peripheral cylindrical portion joined to a peripheral frustoconical portion extending radially outwardly and having a lip-engaging surface on the side facing said rotating member,
   a sealing assembly having a supporting case for mounting with a leak-tight fit on a said rotating member and provided with a radially outwardly extending flange,
   an elastomeric body bonded to said flange and having, to one side of said flange, a radially outwardly projecting auxiliary lip engaging said peripheral cylindrical portion, and
   a main sealing lip comprising an annular, flexible, polytetrafluoroethylene planar wafer bonded to said body on the other side of said flange from said auxiliary lip and extending radially outwardly, said wafer normally tending to assume a substantially radial position, said wafer having an outer edge and first and second opposite faces, said first face engaging and being flexed by said lip-engaging surface of said frustoconical portion,
   the centrifugal force of rotation of said rotating member in either direction tending to urge said first face more snugly against said lip-engaging portion.

4. The seal of claim 3 wherein said sealing assembly comprises
   a metal case with an inner cylindrical portion comprising the portion for mounting said sealing assembly on said rotating member, said flange being radial,
   said elastomeric body having said auxiliary lip extending axially away from said flange in the opposite axial direction from that in which said main sealing lip is flexed.

5. A fluid seal installation including in combination:
   a stationary member having an inner wall providing an outer race for a ball bearing and a terminal inner cylindrical periphery ending at a radially outwardly extending end wall,
   a rotating member having an outer cylindrical portion spaced radially inwardly from said inner cylindrical periphery and providing an inner ball bearing race,
   a ball bearing in and between said races,
   a rigid member having a peripheral cylindrical portion seated on said inner cylindrical periphery and joined to a peripheral frustoconical portion extending toward said rotating member and having a lip-engaging surface on the side facing said rotating member, said frustoconical portion being joined to a radial portion engaging said end wall,
   a sealing assembly having a supporting case with an inner cylindrical portion mounted on a said outer cylindrical portion in a leak-tight fit and provided with a radially outwardly extending flange,
   an elastomeric body bonded to said flange and having, to one side of said flange, a radially outwardly projecting, frustoconical, auxiliary lip engaging said peripheral cylindrical portion, and
   a main sealing lip comprising an annular, flexible, polytetrafluoroethylene planar wafer bonded to said body on the other side of said flange from said auxiliary lip and extending radially outwardly, said wafer normally tending to assume substantially radial position, said wafer having an outer edge and opposite faces, one said face engaging and being flexed by said lip-engaging surface of said frustoconical portion,
   the centrifugal force of rotation of said rotating member in either direction tending to urge both said lips face more snugly against said rigid member.

6. The installation of claim 5 wherein said radially outwardly, extending flange is radial and said auxiliary lip extends in the opposite axial direction from that in which said main sealing lip is flexed.

* * * * *

UNITED STATES PATENT AND TRADEMARK OFFICE
CERTIFICATE OF CORRECTION

PATENT NO. : 4,513,976
DATED : April 30, 1985
INVENTOR(S) : Gustavus A. Bentley, Stephen E. Nash and Gerald P. Pichler It is certified that error appears in the above-identified patent and that said Letters Patent is hereby corrected as shown below:

Column 2, line 2, "frusto-conical" should read "frustoconical".

Column 2, line 19, "The" should read "This".

Signed and Sealed this

Fourteenth Day of October, 1986

[SEAL]

*Attest:*

DONALD J. QUIGG

*Attesting Officer*  *Commissioner of Patents and Trademarks*